US012152413B2

(12) United States Patent
Evarts (10) Patent No.: US 12,152,413 B2
(45) Date of Patent: Nov. 26, 2024

(54) LOCKING DEVICE AND METHODS OF USE THEREOF

(71) Applicant: Jaiden Evarts, Londonderry, NH (US)

(72) Inventor: Jaiden Evarts, Londonderry, NH (US)

( * ) Notice: Subject to any disclaimer, the term of this patent is extended or adjusted under 35 U.S.C. 154(b) by 889 days.

(21) Appl. No.: 17/073,097

(22) Filed: Oct. 16, 2020

(65) Prior Publication Data

US 2021/0189770 A1 Jun. 24, 2021

Related U.S. Application Data

(63) Continuation of application No. PCT/US2019/028321, filed on Apr. 19, 2019, which
(Continued)

(51) Int. Cl.
*E05B 73/00* (2006.01)
*B62H 5/00* (2006.01)
(Continued)

(52) U.S. Cl.
CPC ............... *E05B 73/00* (2013.01); *B62H 5/00* (2013.01); *E05B 71/00* (2013.01);
(Continued)

(58) Field of Classification Search
CPC ...... E05B 73/00; E05B 71/00; E05B 73/0094; B62H 5/00; G07C 9/00309; G07C 9/00563; G07C 2009/00325; G07C 2009/0065
See application file for complete search history.

(56) References Cited

U.S. PATENT DOCUMENTS 3,844,146 A 10/1974 Fouces et al.
4,711,107 A * 12/1987 Drane .................. B62J 6/04
362/267
(Continued)

FOREIGN PATENT DOCUMENTS

CN 104773230 A * 7/2015 ............... B62H 5/00
DE 202006014271 U1 12/2006
(Continued)

OTHER PUBLICATIONS

International Search Report and Written Opinion dated Jul. 2, 2019 for related Application No. PCT/US19/028321.
(Continued)

*Primary Examiner* — Mark A Williams
(74) *Attorney, Agent, or Firm* — Barclay Damon LLP (57) ABSTRACT

The present disclosure provides high security, personalized locking devices for securing a wide variety of personal transportation devices. The personalized locking devices disclosed herein may provide a locking mechanism that is keyed to the specific user. For example, the locking mechanism may be keyed to a user's biometric signature (e.g., a fingerprint, palm print, retinal image, voice recognition, and the like). The personalized locking devices disclosed herein are easy to transport and easy to use. The personalized locking devices disclosed herein may be configured to securely fasten a user's personal transportation device (e.g., motorcycles, mopeds, Segways, bicycles, scooters, skateboards) to an external structure (e.g., a bike rack, a fastening post, etc.) for the purpose of theft prevention.

18 Claims, 10 Drawing Sheets

Related U.S. Application Data is a continuation of application No. 29/644,663, filed on Apr. 19, 2018, now Pat. No. Des. 894,714.

(60) Provisional application No. 62/659,886, filed on Apr. 19, 2018.

(51) Int. Cl.
*E05B 71/00* (2006.01)
*G07C 9/00* (2020.01)

(52) U.S. Cl.
CPC ...... *E05B 73/0094* (2013.01); *G07C 9/00309* (2013.01); *G07C 9/00563* (2013.01); *G07C 2009/00325* (2013.01); *G07C 2009/0065* (2013.01)

(56) References Cited

U.S. PATENT DOCUMENTS

| | | | | |
|---|---|---|---|---|
| 5,802,889 | A | 9/1998 | Arnold | |
| 6,751,992 | B1 | 6/2004 | Esquilin | |
| 8,087,558 | B2 * | 1/2012 | Tsai | B62J 11/00 |
| | | | | 224/431 |
| 9,079,626 | B2 * | 7/2015 | Zuraski | B62J 11/00 |
| 9,228,377 | B1 * | 1/2016 | Chang | B62H 5/00 |
| 9,340,997 | B2 * | 5/2016 | Zuraski | B62H 5/003 |
| 2007/0277569 | A1 | 12/2007 | Vitali | |
| 2014/0000322 | A1 * | 1/2014 | Williams | B62H 5/003 |
| | | | | 70/18 |
| 2014/0150502 | A1 * | 6/2014 | Duncan | E05B 47/0004 |
| | | | | 70/20 |
| 2015/0020558 | A1 | 1/2015 | Williams | |
| 2017/0069154 | A1 * | 3/2017 | Hilton | E05B 71/00 |
| 2020/0023917 | A1 * | 1/2020 | Hu | E05B 71/00 |

FOREIGN PATENT DOCUMENTS

| | | |
|---|---|---|
| JP | H08144604 A | 6/1996 |
| KR | 10-1801509 B1 | 11/2017 |
| WO | 2019204726 A1 | 10/2019 |

OTHER PUBLICATIONS

International Preliminary Report on Patentability dated Oct. 29, 2020 for related Application No. PCT/US19/028321.
Decision to Grant in Japanese Application No. 2020-558505 dated Nov. 14, 2023 [with English translation], 5 pages.

* cited by examiner

LOCKING DEVICE AND METHODS OF USE THEREOF

CROSS-REFERENCE TO RELATED APPLICATIONS

This patent application is a continuation application, filed under 35 U.S.C. § 111 (a) of International Patent Application No. PCT/US19/28321, filed Apr. 19, 2019, which claims the benefit of priority under 35 U.S.C. § 119(e) to U.S. Provisional Application No. 62/659,886, filed on Apr. 19, 2018, and U.S. Design application Ser. No. 29/644,663, filed on Apr. 19, 2018, now issued as U.S. Design Patent No. D894,714. The entire contents of these patent applications are hereby incorporated by reference herein.

FIELD OF THE DISCLOSURE

The disclosure relates to locking devices. More particularly, the disclosure relates to high security, personalized locking devices for personal transportation devices.

BACKGROUND OF THE DISCLOSURE

In recent years, there has been an increase in the use of personal transportation devices such as, for example, motorcycles, mopeds, Segways, bicycles, and scooters that provide low-cost, efficient personal transportation. Such personal transportation devices are beneficial because they reduce traffic congestion and parking problems, and also contribute to the reduction of greenhouse gas emissions. Unfortunately, such personal transportation devices are prone to theft. For example, bicycle theft is a common crime committed in cities with high populations. It is estimated that over 1.5 million bicycles are stolen worldwide every year, which equates to approximately $300-450 million in stolen property. In many cases, bicycle theft may be facilitated by bikes being left unlocked, improperly locked, or locked with low quality security devices such as lightweight cable locks or low cost U-lock devices. Accordingly, there is an urgent need for high security, personalized locking devices that are easy to transport and easy to use.

SUMMARY OF THE DISCLOSURE

In one aspect, the present disclosure provides a locking device including: a clamping head having an opening; a body having a first end and a second end; and a securing ring. The clamping head is rotatably connected to the first end of the body by at least one hinge, and the securing ring is connected to the second end of the body and configured to move between a closed position and an open position.

In an embodiment, the hinge is configured to allow the clamping head to move about 180 degree on an axis perpendicular to the body.

In an embodiment, the at least one hinge has a first hinge end, a second hinge end, and a mating portion.

In an embodiment, the mating portion is configured to mate with a mating dock in the clamping head.

In an embodiment, the securing ring has a first arm with a mounting end and a distal end and a second arm with a connecting end and a distal end, wherein the distal end of the first arm abuts the distal end of the second arm when the securing ring is in a locked position.

In an embodiment, the body includes a biometric reader and a detecting sensor.

In an embodiment, the biometric reader is configured to open the securing ring when it identifies a predetermined biometric identity.

In an embodiment, the detecting sensor is configured to close the securing ring when it detects a locking surface.

In an embodiment, the locking surface is selected from the group consisting of a bike rack, a stanchion, a rail, a post, a fence, and a ring.

In an embodiment, the body includes a charging port and a power supply.

In an embodiment, the charging port is a solar panel or a USB-C port or an AC port or a DC port.

In an embodiment, the body includes a control unit configured to open and close the securing ring.

In an embodiment, the body includes a wireless communication device.

In an embodiment, the wireless communication device is selected from the group consisting of Wi-Fi or Bluetooth.

In an embodiment, the wireless communication device is configured to be in electronic communication with the control unit.

In an embodiment, the wireless communication device is configured to communicate with a personal device selected from the group consisting of a smart phone, a tablet, a wearable computing device, and a laptop.

In an aspect, the disclosure provides a method of securing a personal transportation device including the steps of: attaching a clamping head of a locking device to the personal transportation device; deactivating the locking device to open a securing ring of the locking device; placing the opened securing ring around a locking surface; and activating the locking device to close the securing ring around the anchoring object, thereby securing the personal transportation device to the locking surface.

In an embodiment, the locking device includes a body having a first end and a second end; wherein the clamping head is rotatably connected to the first end of the body by at least one hinge, and the securing ring is connected to the second end of the body and configured to move between a closed position and an open position.

In an embodiment, the activating and deactivating steps are initiated by a biometric reader.

In an aspect, the disclosure provides a locking system, that includes: a locking device, including a clamping head having an opening; a body having a first end and a second end; and a securing ring, wherein the clamping head is rotatably connected to the first end of the body by at least one hinge, and the securing ring is connected to the second end of the body and configured to move between a closed position and an open position; one or more network interfaces to communicate in a network a processor coupled to the network interfaces and the locking device and adapted to execute one or more processes; and a memory configured to store a process executable by the processor, the process when executed operable to: deactivate the locking device to open the securing ring of the locking device; and activate the locking device to close the securing ring.

Where applicable or not specifically disclaimed, any one of the embodiments described herein are contemplated to be able to combine with any other one or more embodiments, even though the embodiments are described under different aspects of the disclosure.

These and other embodiments are disclosed and/or encompassed by, the following detailed description.

BRIEF DESCRIPTION OF THE DRAWINGS

The following detailed description, given by way of example, but not intended to limit the disclosure solely to the specific embodiments described, may best be understood in conjunction with the accompanying drawings, in which.

DETAILED DESCRIPTION OF THE DISCLOSURE

The present disclosure provides high security, personalized locking devices for securing a wide variety of personal transportation devices. Advantageously, the personalized locking devices disclosed herein may provide a locking mechanism that is keyed to the specific user. For example, the locking mechanism may be keyed to a user's biometric signature (e.g., a fingerprint, palm print, retinal image, voice recognition, and the like). The personalized locking devices disclosed herein are easy to transport and easy to use. The personalized locking devices disclosed herein may be configured to securely fasten a user's personal transportation device to an external structure (e.g., a bike rack, a fastening post, etc.) for the purpose of theft prevention. It is contemplated within the scope of the disclosure that the locking devices described herein may be configured to secure a variety of personal transportation devices that may include, but are not limited to, motorcycles, mopeds, Segways, tricycles, bicycles, unicycles, scooters, skateboards, and the like.

Reference will now be made in detail to exemplary embodiments of the disclosure. While the disclosure will be described in conjunction with the exemplary embodiments, it will be understood that it is not intended to limit the disclosure to those embodiments. To the contrary, it is intended to cover alternatives, modifications, and equivalents as may be included within the spirit and scope of the disclosure as defined by the appended claims.

Figure 1:
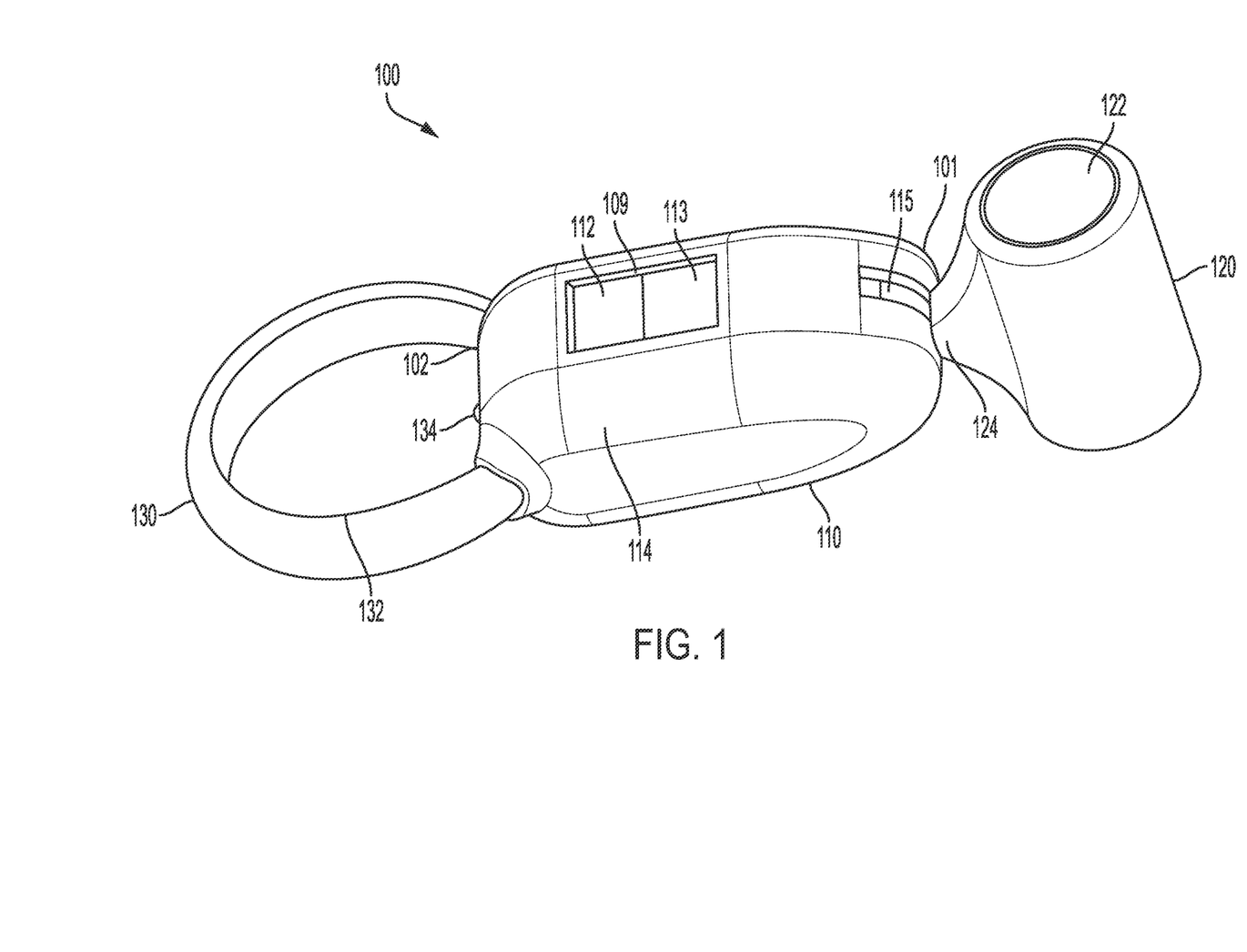
FIG. 1 shows a top perspective view of a locking device according to an exemplary embodiment of the disclosure.

FIG. 1 shows a top, perspective view of locking device 100 according to an exemplary embodiment of the disclosure. Locking device 100 includes main body 110 having a housing 114 with a first end 101 and a second end 102, a recess 109, a clamping head 120, a securing ring 130, and a detecting sensor 134.

Clamping head 120 includes clamping passageway 122 and clamp connecting end 124. Clamping passageway 122 may be configured to fixedly or removably attach clamping head 120 to a personal transportation device (e.g., by attaching to a crossbar, an upright, a wheel, and the like). Clamping head 120 may be configured to attach to a first end 101 of main body 110 of locking device 100 via hinge 115.

Recess 109 located on a top surface of main body 110, may be configured to house one or more user accessible interface structures such as, for example, biometric reader 112 and charging port 113. Other exemplary interface structures may include, but are not limited to, a panic alarm, a GPS tracking device, a wireless and/or cellular communication device, a Bluetooth communication device or module, a USB port, a data link port, and the like. Biometric reader 112 may be any of a variety of biometric readers configured to identify any of a variety of a user's specific biometric identification patterns such as, for example, a fingerprint, a palm print, a retinal print, a voiceprint, and the like. Charging port 113 may be configured to charge or recharge an internal power supply. For example, charging port 113 may include, but is not limited to, a solar panel, a USB-C port, an AC and/or DC charging port, and the like.

Securing ring 130 may be configured to attach to second end 102 of main body 110. Securing ring 130 surrounds locking passageway 132 when in the locked position. Locking device 100 further includes detecting sensor 134, which may be positioned on second end 102 of main body 110 and within the area encompassed by locking passageway 132.

As shown in FIG. 1, main body 110 may be a shaped structure having a first end 101 and a second end 102. Main body 101 functions to connect an operational locking mechanism (e.g., securing ring 130) and clamping head 120, protect and house the user accessible interface structures (e.g., biometric input 112 and charging port 113). Additionally, main body 101 may be configured to allow for attachment of locking device 100 to non-vertical external stanchions via clamping head 120, and may also be configured to adjust the angle between securing ring 130 and clamping head 120 to allow for easier transport of locking device 100 while it is attached to a personal transportation device.

Figure 2:
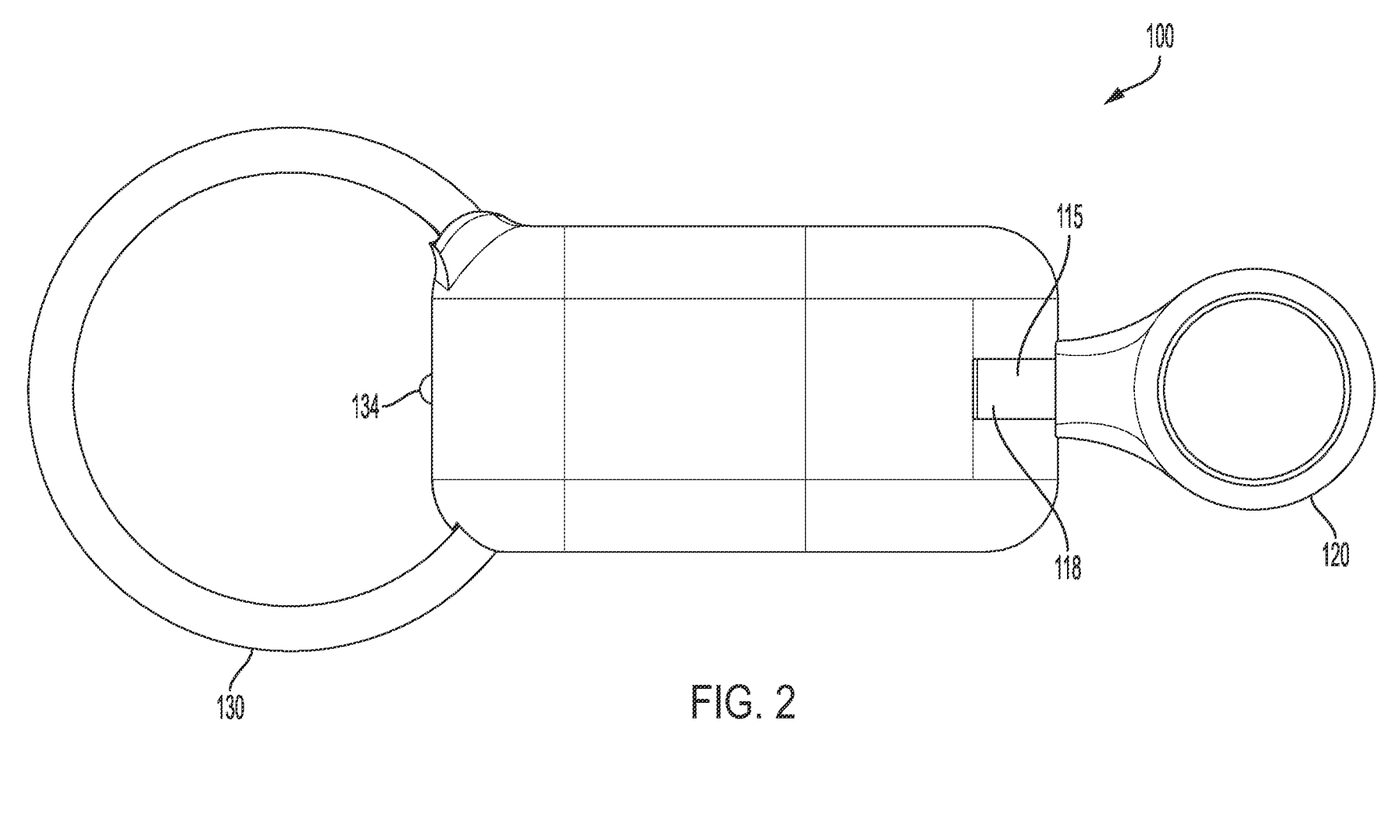
FIG. 2 is a bottom view of a locking device according to an exemplary embodiment of the disclosure.

FIG. 2 shows a bottom view of locking device 100 showing securing ring 130 and clamping head 120. As shown, clamping head 120 may be connected to main body 110 via hinge 115, which may be positioned within hinge recess 118. One of skill in the art will appreciate that hinge recess 118 may be configured in any of a variety of different ways depending on the specific size, shape, and configuration of hinge 115.

Figure 3:
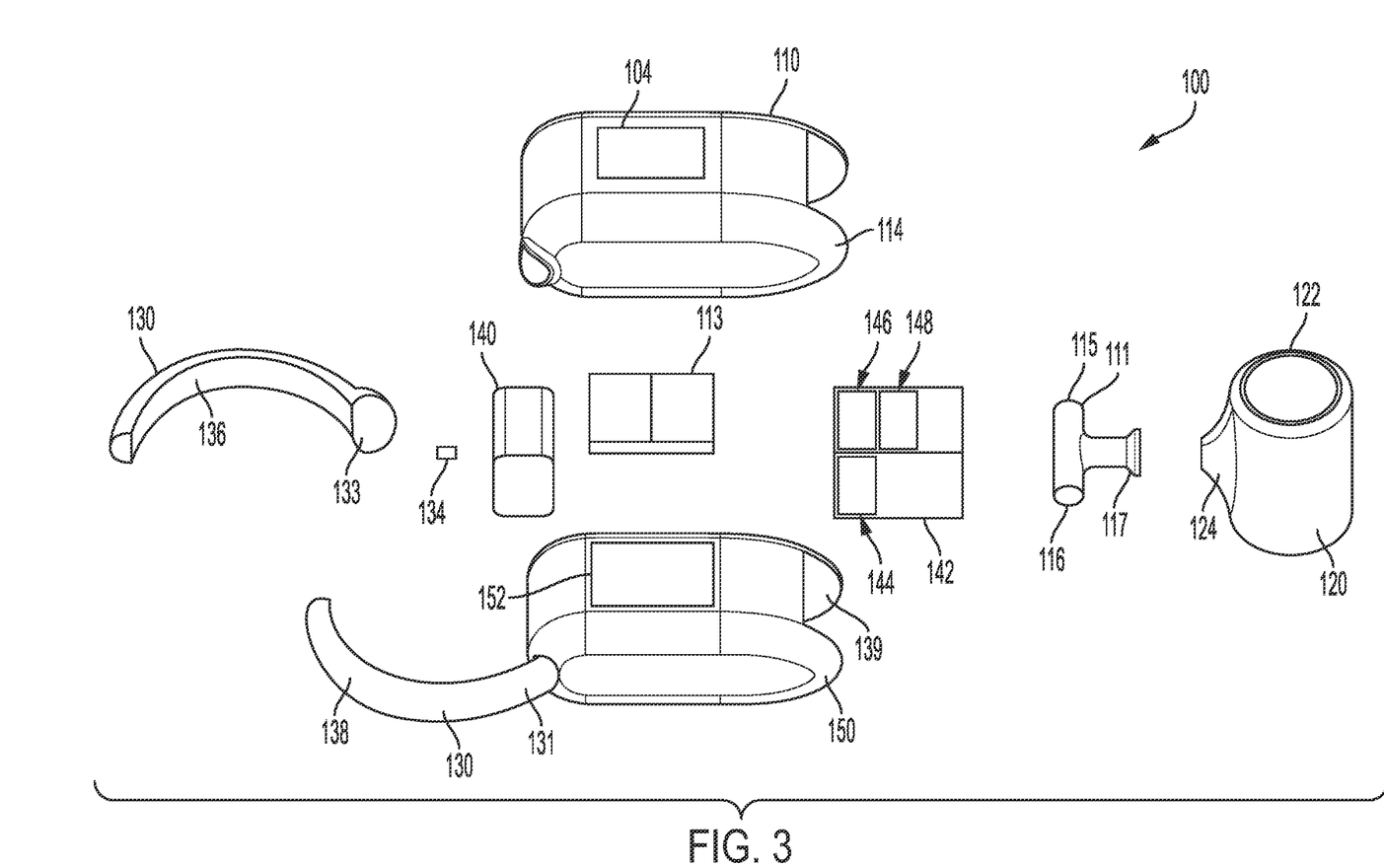
FIG. 3 is an exploded view of a locking device according to an exemplary embodiment of the disclosure.

Referring to FIG. 3, which depicts an exploded view of locking device 100, it can be seen that main body 110 may be an outer shell configured to encompass inner body 150.

In an exemplary embodiment, securing ring 130 may be comprised of two parts: first arm 135 and second arm 136. In other words, the operational mechanism may consist of a shaped structure (e.g., a circle, an oval, and the like) having a first arm 135 and a second arm 136 and a locking mechanism 140 for closing/locking first arm 135 and second arm 136. Locking mechanism 140 may be comprised of any of a variety of locking mechanisms known to one of skill in the art (e.g., a motor, a spring, a ratchet, and the like). In an illustrative embodiment, locking mechanism 140 may be configured to reversibly move second arm 136 so as to abut first arm 135. The shaped structure of the operational mechanism is preferably comprised of a rounded structure, however, other non-round structures may be utilized for securing ring 130. In an illustrative embodiment, first arm 135 may be fixedly mounted to inner body 150 via any of a variety of means known to one of skill in the art (e.g., welding, bonding, gluing, and the like). In another illustrative embodiment, first arm 135 may be integrally formed with inner body 150 via a unibody construction. In another illustrative embodiment, the operational mechanism may consist of a rigid or movable first arm and a movable second arm configured to interact with locking mechanism 140. Locking mechanism 140 functions to secure the locking device 100 to an external stanchion by moving the second arm to abut the first arm, thereby locking the device to the stanchion. The operational mechanism is connected to the main body whereby a locking of the operational mechanism results in a securing of the device to the external stanchion. The operational mechanism may be operated by a control unit 144 that may be activated by biometric reader 112 and the detecting sensor 134, which may be configured to automatically close securing ring 130 when proximity of a mounting stanchion or post is detected. Instructions for operating control unit 144 may be stored in memory 146 and may communicate with electronic devices or networks via network interface module 148. Locking mechanism 140, control unit 144, memory 146, and network interface module 148 may communicate via a bus (not shown), which is well known to one of skill in the art.

The one or more user accessible interfaces may be configured to reside within the interior recess 152. These may include, for example, biometric reader 112 and charging port 113. Biometric reader 112 may include an electronic device or other device whose function is to identify the user based on the individual's unique biometric signature (e.g., a fingerprint, a palm print, a retinal print, a voiceprint, and the like), a control unit which communicates with the operational mechanism (e.g., securing ring 130), a power supply 142 and means of re-charging the power supply such as, for example, charging port 113. The control unit and other electronics (e.g., wireless transmitter, a Bluetooth communication device, cellular transmitter, GPS tracking device, and the like) may be housed within the inner body 150. The biometric reader 112 and charging port 113 may be seated within interior recess 152 of inner body 150. These user accessible interfaces may be partially encased in the inner body 150 and further encased by main body 110. Biometric reader 112 may be operably linked to locking mechanism 140 via the control unit so that when the biometric reader 112 detects the user's unique signature, the operational mechanism is activated and securing ring 130 is opened.

The user accessible interfaces (e.g., 112, 113) may be housed in the main body 110 and may consist of a biometric reader 112, a control unit, power supply 142, and charging port 113. The biometric reader 112 may be, for example, a fingerprint scanner that detects the user's unique fingerprint and triggers the securing ring 130 through the control unit. The control unit is an electronic device, preferably a microcontroller or microprocessor, which contains the record of the user's fingerprint. The control unit checks each input from the biometric reader 112 against its stored data and, if the input matches the stored data, the control unit triggers the securing ring 130 to open. The biometric reader 112 and control unit are powered by the power supply 142 which contains one or more re-chargeable batteries. These batteries are re-charged by the charging port 113 which may be, for example, a solar panel housed in the main body 110 of the locking device 100. The control unit communicates with the securing ring 130 through a wired connection with the locking mechanism 140.

The biometric reader 112 may also be any biometric reader, blood vessel pattern reader, retinal scanner, DNA reader, etc. The biometric reader 112 be replaced or combined with an RFID, Bluetooth, or other wireless communication device. The control unit may be incorporated into the specific biometric or wireless communication device, or may be a separate unit. The control unit may be any electronic or non-electronic device which performs the required tasks of the control unit. The charging port 113 may be a power port for a wired connection, kinetic motion generator or other device that can provide power for the re-charging of the power supply 142. The biometric reader 112 may be powered directly from the charging port 113 and/or the power supply 142, which may or may not be included. The control unit may have a wireless connection with the securing ring 130.

In accordance with various embodiments described herein, the term "wireless communication device" may describe one or more electronic devices capable of performing procedures associated with various embodiments of the disclosure (e.g., communicating with a locking device as described herein, tracking a locking device via GPS, receiving tamper alerts from a locking device, identifying a locking device user and/or locking or unlocking the locking device based on a Bluetooth communication identifying the user). In accordance with various implementations, any one of these electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of active or passive electronic device (e.g., a keychain fob) having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system (e.g., as part of a WLAN, WPAN and/or an ad hoc wireless network). For example, WLAN technology may include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. In some embodiments, the WPAN technology may include a Bluetooth wireless communication subsystem or radio, and the Bluetooth radio can implement one or more versions of a Bluetooth communication protocol in accordance with a present or future developed Bluetooth Special Interest Group (SIG) technology.

It is contemplated within the scope of the disclosure that a Bluetooth device/module within the locking device may communicate with a user device (e.g., smart phone, smart tablet, laptop, and the like) to confirm the identity of the user via a biometric input associated with the user's device (e.g., a thumbprint recognition device, a facial recognition device, and the like). Accordingly, recognition of a user's identity by a trusted device known to be associated with the user, may be used as an alternative method by which to interface with the locking device. In this manner, a user may unlock the locking device, or lock the locking device, by input into a device such as, for example, a smart phone.

Clamping head 120 is a shaped structure having a clamping passageway 122 and a clamp connecting end 124. The clamp is preferably comprised of a hollow, cylindrical structure, however, various other non-round structures may be utilized. The function of the clamp is to semi-permanently attach locking device 100 to the user's personal transportation device. The clamp connecting end 124 of the clamping head 120 may be connected to main body 110 via hinge 115 so that the semi-permanent securing of the clamp results in a securing of locking device 100 to the user's personal transportation device. For example, clamp connecting end 124 may be configured to mate with mating end 117 of hinge 115, which may in turn be hingedly mounted to inner body 150 via hinge mount 119. In an exemplary embodiment, inner body 150 may include two opposing hinge mounts 119, which are configured to receive a first hinge end 111 and a second hinge end 116 of hinge 115 so as to allow mating end 117 to rotate in an axis perpendicular to securing ring 130.

The clamping head 120 is a roughly cylindrical structure preferably made from metal with a plastic sheath. The clamping head 120 provides a means for semi-permanent attachment of the locking device 100 to the user's personal transportation device. The inner face of the clamping passageway 122 may be lined with a gripping surface to provide a better attachment to the vehicle.

The clamping head 120 may be non-cylindrical for attachment to non-cylindrical structures on the user's personal transportation device. The clamping head 120 may be constructed solely of metal (no sheath) or of another non-metal material. The clamping head 120 may be comprised of one or more parts either entirely separate or connected via hinge(s). In this regard, clamping head 120 may be split asymmetrically so that the two pieces would connect at a point that was not directly opposite of hinge 115. The clamping head 120 may, or may not, be lined with a gripping surface. The clamping head 120 may include a bearing or other device for rotation around the structure on the user's vehicle.

Locking device 100 may the composed of main body 110 and inner body 150, which may be constructed of metal to provide a sturdy, interior structure to prevent theft by a cutting of the main body 110 of locking device 100. The inner body 150 provides a housing for the power supply 142, charging port 113, detecting sensor 134, part of the securing ring 130 and the biometric reader 112 and may be configured to provide protection from tampering. The housing 114 may be a sheath preferably constructed of durable plastic whose purpose is to improve the aesthetics of the device and to provide an added layer of defense against cutting of the main body 110. Additionally, housing 114 may be configured to be water resistant and/or waterproof so as to protect the enclosed biometric reader 112, power supply 142, detecting sensor 134 and related circuitry, and control unit.

Figure 4:
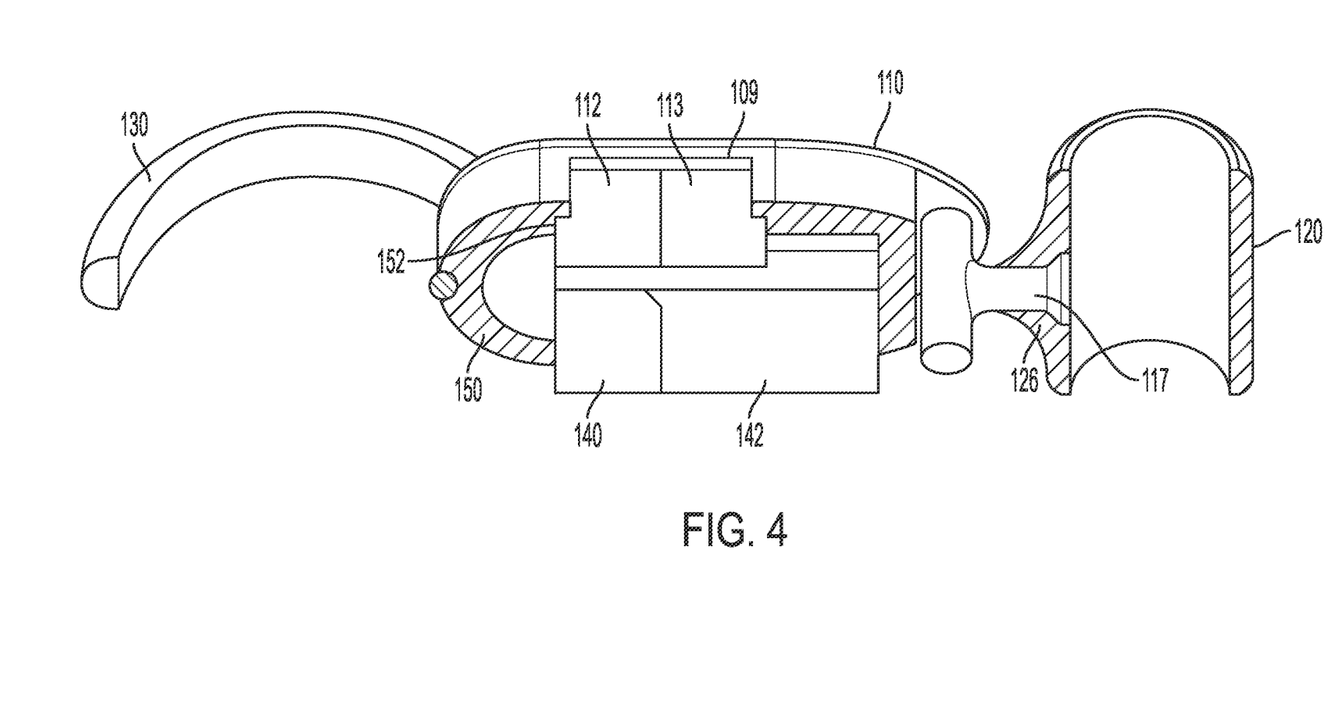
FIG. 4 is a cross-sectional view of a locking device according to an exemplary embodiment of the disclosure.

Referring now to FIG. 4, hinge 115 may be configured to be multidirectional and to allow for up to a full hemisphere of motion so that locking device 100 may be affixed to a structure at any angle and/or may be mounted on any suitable structure on the user's personal vehicle. As shown in FIGS. 3 and 4, mating end 117 of hinge 115 may be configured with a flange designed to mate with a mating dock 126 positioned within clamp connecting end 124. This mating configuration may allow clamping head 120 to rotate 360° around mating end 117 of hinge 115, thereby increasing the range of motion of clamping head 120 relative to main body 110. It is also contemplated within the scope of the disclosure that the mating end 117 of hinge 115 may be configured to provide a desired range of rotation of clamping head 120 around mating end 117 such as, for example, 0-90°, 0-180°, 0-360°, or particular sub-ranges therein. It is contemplated within the scope of the disclosure that hinge 115 may rotate through a full hemisphere with respect to main body 110. One of skill in the art will appreciate that such ranges of rotation may be limited by configuring mating end 117 with a limiter, such as a detent or one or more detents. In other embodiments, mating and 117 of hinge 115 may be configured with a ball instead of a flange to create a universal joint-like coupling with mating dock 126, which would be configured to receive the ball end of mating end 117. It is contemplated within the scope of the disclosure that hinge 115 may be constructed of a variety of durable materials to prevent theft by cutting (e.g., metal, ceramics, hard plastics, combinations thereof, and the like). The main body 110 may contain more than one hinge 115 or no hinge 115 at all.

In an illustrative embodiment, main body 110 may be comprised solely of inner body 150 in lieu of housing 114 and inner body 150 together. While inner body 150 may be composed of metal, it is contemplated within the scope of the disclosure that it may be constructed of other, non-metal, materials as well. Similarly, the housing 114 may also be constructed of other, non-plastic, materials. The housing 114 may encase the entirety of the inner body 150, or only a portion thereof when present on the device. The elements housed in inner body 150 may be housed in the first and 101 or second end 102, either together or separately. The second end 102 of the main body 110 may include the first arm 135 of the locking mechanism 140 as an extension of the inner body 150 and/or housing 114.

The locking mechanism 140 is preferably partially encased by the main body 110 and is composed of a first arm 135, second arm 136, closing/locking mechanism 140, and detecting sensor 134. The arms 135 and 136 of the locking mechanism 140 may be constructed from metal to prevent theft by cutting and may generally be semi-circular in structure. The first arm 135 of the locking mechanism 140 may be rigid and formed as an extension of the inner body 150 and/or housing 114 of the main body 110. The second arm 136 may be movable.

Figure 5:
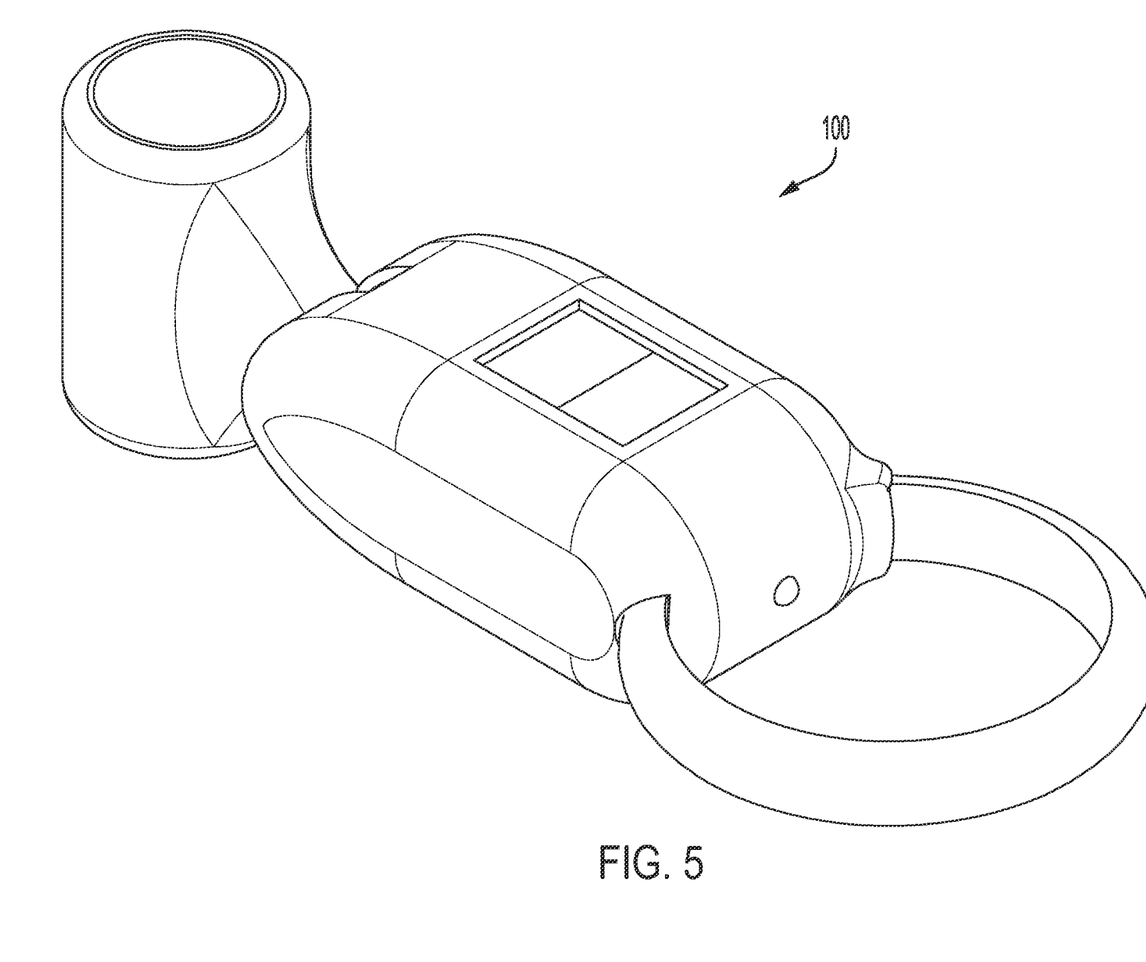
FIG. 5 is a perspective view of a locking device in the locked position according to an exemplary embodiment of the disclosure.
Figure 6:
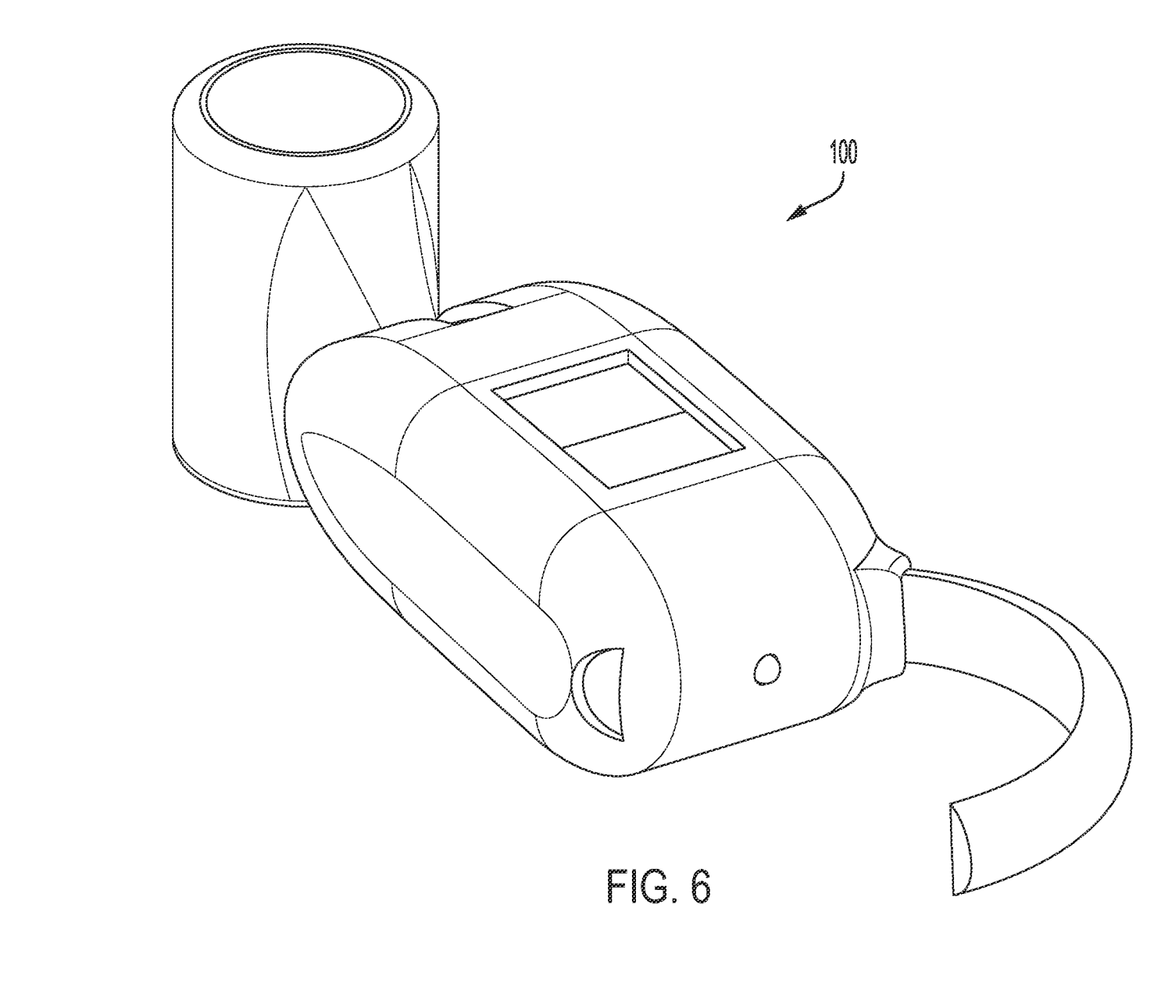
FIG. 6 is a perspective view of a locking device in the open position according to an exemplary embodiment of the disclosure.

FIGS. 5 and 6 depict an exemplary embodiment of the locking device 100 in a closed position and an open position, respectively. In the embodiment shown in FIGS. 5 and 6, second arm 136 may be positioned within a track within the main body 110 to allow it to spiral out and connect with/abut to the first arm 135. The second arm 136 may be moved between the open and closed positions by closing/locking mechanism 140, which may consist of a motor to drive the motion of the second arm 136 and lock the arm 136 in the extended (lock closed) and retracted (lock open) positions. The closing/locking mechanism 140 may in turn be driven by communication from the biometric reader 112 (e.g., to open the lock) or the detecting sensor 134 (e.g., to close the lock) and powered by the power supply 142. The detecting sensor 134 may be a proximity sensor, powered by the power supply 142, which detects when the device is near an external stanchion (e.g., bike rack, locking post, rail, fence, and the like) and triggers the motor to close the second arm 136 thereby locking the locking device 100 to the stanchion. The locking end 133 of the locking device 100 is located at the end of the first and/or second arms (135, 136) of the securing ring 130.

Figure 7:
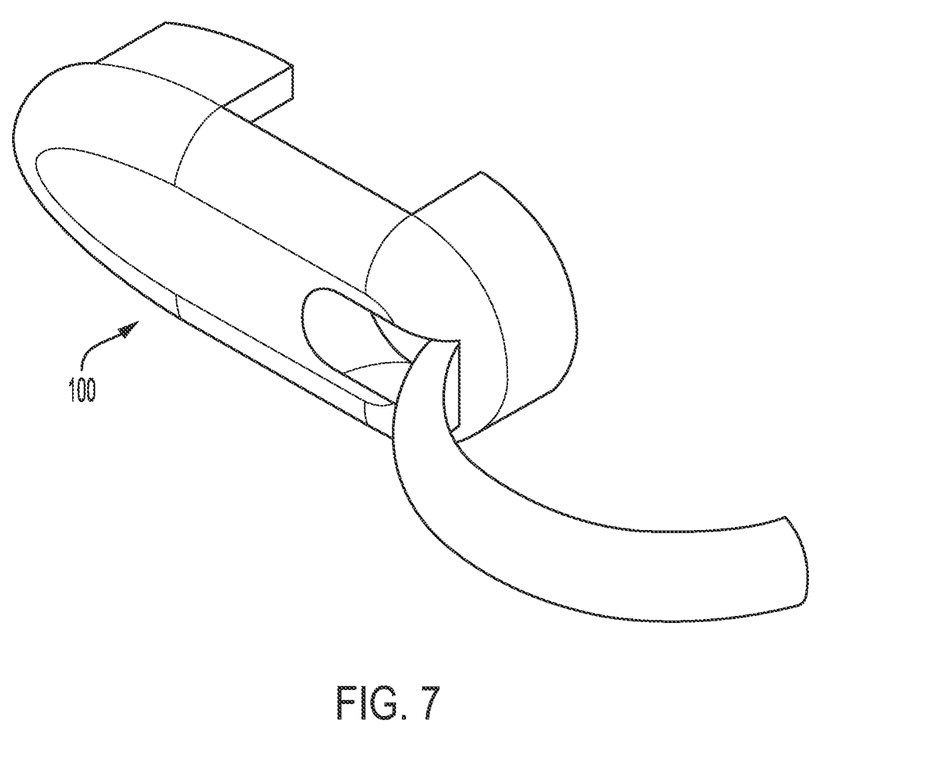
FIG. 7 is a perspective view of a locking device in the locked position according to an additional exemplary embodiment of the disclosure.
Figure 8:
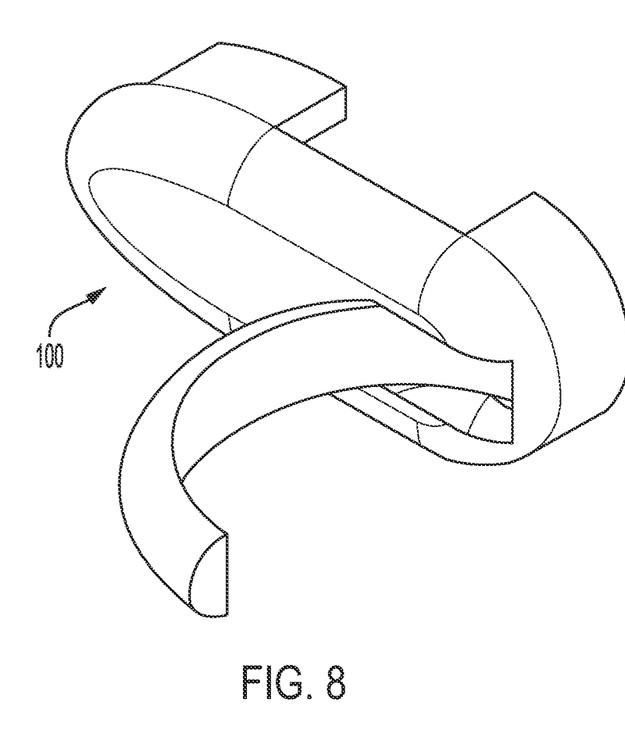
FIG. 8 is a perspective view of a locking device in the open position according to an additional exemplary embodiment of the disclosure.

The first and second arms (135, 136) of the securing ring 130 may have a plastic or non-plastic sheath in addition to the sturdy metal core of the arms. The arms may also be constructed from other, non-metal, materials and may include gripping features (e.g., cruise, nubs, ribs, and the like) on the inside curvature of the arms. The arms of the securing ring 130 may have structures that are not semi-circular. The first arm 135 of the securing ring 130 may be movable and operated by the closing/locking mechanism 140 as shown in FIGS. 5 and 6. In another illustrative embodiment shown in FIGS. 7 and 8, the second 136 and/or first arm 135 may move in a swinging motion as opposed to riding in a track in the main body 110. The closing/locking mechanism 140 may consist of a spring, latch, ratchet, etc. as opposed to, or in addition to, a motor. The locking mechanism 140 may be a latch, pin, ratchet, motor, and the like. The detecting sensor 134 may consist of, but is not limited to, a sensor such as an ultrasonic sensor, a light sensor, a distance sensor, a touch sensor, etc. The closing/locking mechanism 140 and detecting sensor 134 may be powered directly from the charging port 113 and/or power supply 142.

Figure 9:
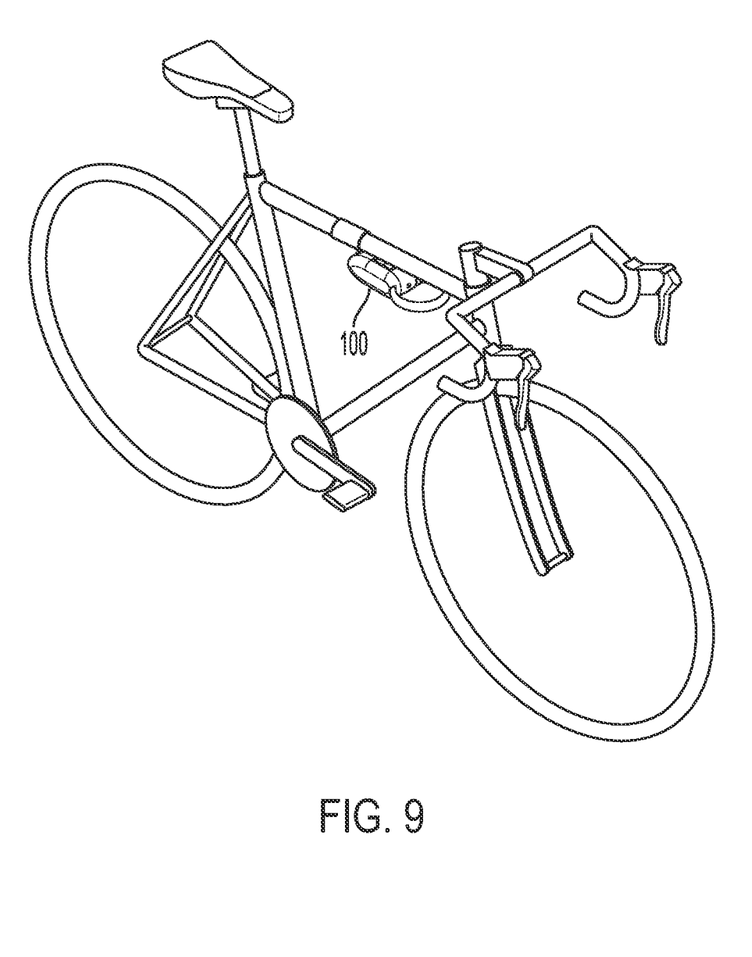
FIG. 9 is a picture of a locking device mounted on a bicycle according to an exemplary embodiment of the disclosure.

FIG. 9 is a picture of a locking device mounted on a bicycle according to an exemplary embodiment of the disclosure.

Figure 10:
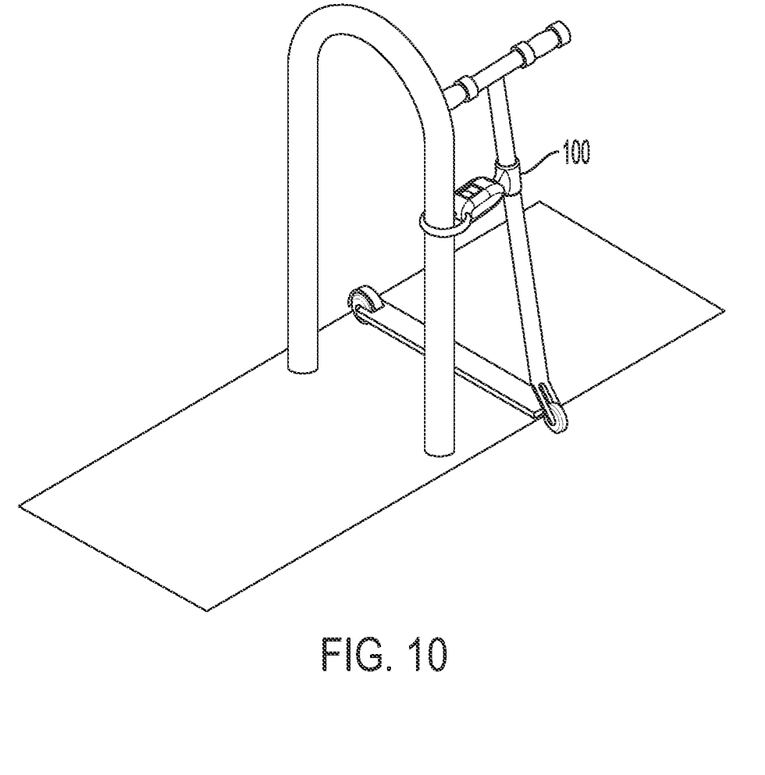
FIG. 10 is a picture of a locking device being used to lock a scooter to a storage rack according to an exemplary embodiment of the disclosure.

FIG. 10 depicts a locking device being used to lock a scooter to a storage rack according to an exemplary embodiment of the disclosure.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

The foregoing description has been directed to specific embodiments of a locking device 100. It will be apparent, however, that other variations and modifications may be made to the described embodiments, with the attainment of some or all of their advantages. For instance, it is expressly contemplated that the components and/or elements described herein can be implemented as a locking device that comprises at least one data or cellular network interface that communicates with a data or cellular communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., ROM, RAM, compact disc (CD)-ROMs, magnetic tapes, floppy disks, flash drives, smart cards and optical data storage devices, and the like) having program instructions executing on a controller, CPU, computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

A computer system (or digital device) may be used to receive, transmit, display and/or store results, and operate the locking mechanism described herein. A computer system may be understood as a logical apparatus that can read instructions from media (e.g. software) and/or network port (e.g. from the internet, Wi-Fi, Bluetooth, etc.), which can optionally be connected to a server having fixed media via a dataport. A computer system may comprise one or more of a CPU, disk drives, input devices such as keyboard and/or mouse, and a display (e.g. an LCD). Data communication, such as transmission of instructions or reports, can be achieved through a communication device as described above to a server at a local or a remote location. The communication device can include any means of transmitting and/or receiving data (e.g. internet port, Wi-Fi, Bluetooth, etc.). For example, the communication device can be a network connection, a wireless connection, cellular network, or an internet connection. It is envisioned that data relating to the present disclosure can be transmitted over such networks or connections (or any other suitable means for transmitting information, including but not limited to mailing a physical report, such as a print-out) for reception and/or for review by a receiver. The receiver can be but is not limited to an individual, or electronic system.

In some embodiments, the computer system may comprise one or more processors. Processors may be associated with one or more controllers, calculation units, and/or other units of a computer system, or implanted in firmware as desired. If implemented in software, the routines may be stored in any computer readable memory such as in RAM, ROM, flash memory, a magnetic disk, a laser disk, or other suitable storage medium. Likewise, this software may be delivered to a computing device via any known delivery method including, for example, over a communication channel such as a telephone line, the internet, a wireless connection, etc., or via a transportable medium, such as a computer readable disk, flash drive, etc. The various steps may be implemented as various blocks, operations, tools, modules and techniques which, in turn, may be implemented in hardware, firmware, software, or any combination of hardware, firmware, and/or software. When implemented in hardware, some or all of the blocks, operations, techniques, etc. may be implemented in, for example, a custom integrated circuit (IC), an application specific integrated circuit (ASIC), a field programmable logic array (FPGA), a programmable logic array (PLA), etc.

A machine readable medium which may comprise computer-executable code may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The subject computer-executable code can be executed on any suitable device which may comprise a processor, including a PC or a mobile device such as a smartphone or tablet. Computer circuitry may be placed within the body of the locking device disclosed herein, and may include numerous integrated circuit chips, such as a microprocessor, memory, interface circuits, and others. Inputting devices such as a keyboard, mouse, or touch-sensitive screen, optionally provide for input from a user. The computer can include appropriate software for receiving user instructions, either in the form of user input into a set of parameter fields, e.g., in a GUI, or in the form of preprogrammed instructions, e.g., preprogrammed for a variety of different specific operations.

It will also be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

ELEMENTS

- 100: Locking Device
- 101: First End
- 102: Second End
- 109: Exterior Recess
- 110: Main Body
- 111: First Hinge End
- 112: Biometric Reader
- 113: Charging Port
- 114: Housing
- 115: Hinge
- 116: Second Hinge End
- 117: Mating End
- 118: Hinge Recess
- 119: Hinge mount
- 120: Clamping Head
- 122: Clamping Passageway
- 124: Clamp Connecting End
- 126: Mating dock
- 130: Securing Ring
- 131: Mounting End
- 132: Locking Passageway
- 133: Locking End
- 134: Detecting Sensor
- 135: Fixed Arm
- 136: Locking Arm
- 140: Locking Mechanism
- 142: Power Supply
- 144: Control Unit
- 146: Memory
- 148: Network Interface Module
- 150: Inner Body
- 152: Interior Recess

INCORPORATION BY REFERENCE

All documents cited or referenced herein and all documents cited or referenced in the herein cited documents, together with any manufacturer's instructions, descriptions, product specifications, and product sheets for any products mentioned herein or in any document incorporated by reference herein, are hereby incorporated by reference, and may be employed in the practice of the disclosure.

EQUIVALENTS

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

What is claimed is:

1. A locking device for use with a personal transportation device, comprising:
   a clamping head having an opening;
   a body having a first end and a second end;
   a control unit, and
   a securing ring,
   wherein the clamping head is rotatably connected to the first end of the body by at least one hinge, and the securing ring is connected to the second end of the body,
   wherein the control unit triggers the securing ring to transition between an open position and a closed position via a locking mechanism, wherein the control unit is in communication with a biometric reader and proximity detecting sensor,
   wherein the biometric reader is configured to open the locking mechanism, and the proximity detecting sensor is configured to close the locking mechanism when a locking surface for securing the personal transportation device is detected.

2. The locking device of claim 1, wherein the hinge is configured to allow the clamping head to move about 180 degrees on an axis perpendicular to the body.

3. The locking device of claim 1, wherein the at least one hinge has a first hinge end, a second hinge end, and a mating portion.

4. The locking device of claim 3, wherein the mating portion is configured to mate with a mating dock in the clamping head.

5. The locking device of claim 1, wherein the securing ring has a first arm with a mounting end and a distal end and a second arm with a connecting end and a distal end, wherein the distal end of the first arm abuts the distal end of the second arm when the securing ring is in a locked position.

6. The locking device of claim 1, wherein the biometric reader is configured to open the securing ring when it identifies a predetermined biometric identity of a user of the personal transportation device.

7. The locking device of claim 1, wherein the locking surface for securing the personal transportation device is selected from the group consisting of a bike rack, a stanchion, a rail, a post, a fence, and a ring.

8. The locking device of claim 1, wherein the body includes a charging port and a power supply configured to power the device.

9. The locking device of claim 8, wherein the charging port is powered by a solar panel or a USB-C port or an AC port or a DC port.

10. The locking device of claim 1, wherein the control unit is configured to open and close the securing ring upon confirmation of user identity.

11. The locking device of claim 1, wherein the body includes a wireless communication device configured for local and/or wide area electronic communication.

12. The locking device of claim 11, wherein the wireless communication device is selected from the group consisting of Wi-Fi or Bluetooth.

13. The locking device of claim 12, wherein the wireless communication device is configured to be in electronic communication with the control unit to trigger the securing ring to transition between the open position and the closed position via the locking mechanism.

14. The locking device of claim 13, wherein the wireless communication device is configured to communicate with a personal device selected from the group consisting of a smart phone, a tablet, a wearable computing device, and a laptop.

15. A method of securing a personal transportation device, comprising:
   attaching a clamping head of the locking device of claim 1 to the personal transportation device;
   deactivating the locking device to open a securing ring of the locking device;
   placing the opened securing ring around a locking surface; and
   activating the locking device to close the securing ring around the anchoring object, thereby securing the personal transportation device to the locking surface.

16. The method of claim 15, wherein the locking device includes a body having a first end and a second end; wherein the clamping head is rotatably connected to the first end of the body by at least one hinge, and the securing ring is connected to the second end of the body and configured to move between a closed position and an open position.

17. The method of claim 14, wherein the activating and deactivating steps are initiated by a biometric reader.

18. A locking system for use with a personal transportation device, comprising:
   a locking device, including:
      a clamping head having an opening;
      a control unit;
      a body having a first end and a second end; and
      a securing ring, wherein the clamping head is rotatably connected to the first end of the body by at least one hinge, and the securing ring is connected to the second end of the body,
      wherein the control unit triggers the securing ring to transition between an open position and a closed position via a locking mechanism, wherein the control unit is in communication with a biometric reader and proximity detecting sensor,
   one or more network interfaces to communicate with the control unit in a network;
   a processor coupled to the network interfaces and the locking device and adapted to execute one or more processes; and
   a memory configured to store a one or more processes process executable by the processor, the one or more processes when executed operable to:
      deactivate the locking mechanism of the locking device to open the securing ring of the locking device when the biometric reader identifies a predetermined biometric identity of a user of the personal transportation device; and
      activate the locking mechanism of the locking device to close the securing ring when the proximity detecting sensor detects a locking surface for securing the personal transportation device.

* * * * *